United States Patent [19]
Kuckelsberg et al.

[11] Patent Number: 5,876,041
[45] Date of Patent: Mar. 2, 1999

[54] CHUCK DRIVE SYSTEM, ESPECIALLY FOR A ROTATING CLAMPING DEVICE OF A MACHINE TOOL

[75] Inventors: Frank Kuckelsberg; Eckhard Brangs, both of Bielefeld, Germany

[73] Assignee: Berg & Co. GmbH, Bielefeld, Germany

[21] Appl. No.: 727,374

[22] Filed: Oct. 8, 1996

[30] Foreign Application Priority Data

Oct. 20, 1995 [DE] Germany ............... 195 39 135.7

[51] Int. Cl.⁶ ...................................... B23B 31/30
[52] U.S. Cl. ................ 279/4.02; 91/433; 92/86; 279/126
[58] Field of Search ............... 279/4.02, 4.12, 279/126; 91/1, 421, 433; 92/5 R, 16, 153; 60/455

[56] References Cited

U.S. PATENT DOCUMENTS

| | | | |
|---|---|---|---|
| 2,509,673 | 5/1950 | Church | 279/4.12 |
| 3,855,902 | 12/1974 | Kirst | 279/4.02 |
| 4,387,907 | 6/1983 | Hiestand | 279/4.02 |
| 4,536,000 | 8/1985 | Rohm | 279/126 |
| 4,700,610 | 10/1987 | Bauer et al. | 91/433 |

FOREIGN PATENT DOCUMENTS

| | | | |
|---|---|---|---|
| 0 220 134 | 10/1990 | European Pat. Off. . | |
| 1028286 | 5/1953 | France | 279/4.12 |
| OS 24 198 08 | 12/1974 | Germany . | |
| 252990 | 1/1988 | Germany | 279/4.02 |
| 2103123 | 2/1983 | United Kingdom | 408/59 |

*Primary Examiner*—Steven C. Bishop
*Attorney, Agent, or Firm*—Henry M. Feiereisen

[57] ABSTRACT

A chuck drive system, especially for a rotating clamping device of a machine tool, includes a rotating chuck cylinder, a stationary frame positioned adjacent the chuck cylinder, and a piston which subdivides the cylinder into two pressure chambers and is formed with a piston rod having one end rotatably supported in the stationary frame. Fluid under pressure is supplied to the pressure chambers, whereby check valves are positioned in the passageways to the pressure chambers to maintain the fluid pressure in the pressure chambers. In order to monitor the fluid pressure in the pressure chambers, a pressure monitoring unit is provided which includes pressure sensors that are respectively assigned to the pressure chambers for determining the fluid pressure in the pressure chambers separately and independently from one another. The pressure sensors form electrical output signals commensurate with the fluid pressure in the pressure chambers, with the monitoring unit deriving from the output signals an analog differential pressure signal to determine the actual actuation force applied upon the piston.

10 Claims, 2 Drawing Sheets

CHUCK DRIVE SYSTEM, ESPECIALLY FOR A ROTATING CLAMPING DEVICE OF A MACHINE TOOL

BACKGROUND OF THE INVENTION

The present invention relates to a chuck drive system, especially for a rotating clamping device of a machine tool, and is directed in particular to a chuck drive system of a type including a rotating chuck cylinder receiving a piston subdividing the cylinder in two pressure chambers and having a piston rod rotatably supported in a stationary headstock, with the pressure chambers being supplied with a fluid under pressure via passageways through the piston rod, and with check valves being positioned in the fluid passageways for sealing the pressure chambers.

In general, a chuck is attached to the drive spindle of a machine tool and used to grip and actively engage a revolving workpiece, cutting tool, drill, tool holder etc., via a collet, whereby a displacement of the chuck in an axial direction between an advanced position and a withdrawn position will cause the collet to release or clamp the workpiece, cutting tool or the like. The pull-in and push-out forces are transmitted by the chuck most conveniently through supply of compressed oil to the pressure chambers by a stationary hydraulic mechanism by which the velocity of the piston and the pressure acting upon the piston is determined. In order to maintain and control these forces during rotation of the chuck, hydraulic fluid is continuously supplied to the opposing pressure chambers of the rotating cylinder via the headstock which runs with contactless gap seals. The clamping pressure is maintained through continuous supply of pressure fluid, e.g. compressed oil, during operation of the drive spindle, whereby leakage oil escaping from the sealing gaps represents a source of loss. A further source of loss is the viscous friction of oil within the sealing gaps which friction increases by the square of the rotational speed. Both these energy losses limit the application range of the conventional headstock and consequently the range of attainable rotational speeds and clamping forces.

German publication no. DE-OS 24 19 808 and European Pat. No. 0 220 134 B1 disclose chuck drive systems in which each of the pressure chambers can be hermetically sealed off by mutually unblocking check valves so that the supply of pressure fluid can be effectively shut off during operation of the cylinder. For safety reasons, the pressure inside the sealed-off pressure chambers must be continuously monitored. In order to minimize energy losses in the headstock, it is further necessary to ensure that pressure fluid is substantially purged from the sealing gaps during operation of e.g. the drive spindle, once the supply of pressure fluid is cut.

Conventionally, the clamping pressure inside the pressure chamber is monitored by mechanically operating devices in form of spring-biased floating secondary pistons positioned in the pressure chambers and securely joined together via a linkage for axially movement in unison with a ring which functions as a control disk. A fixed section of the drive supports a position sensor for axial displacement. Upon drop of the clamping pressure, the ring-shaped control disk is displaced which in turn is sensed by the position sensor which can be adjusted to the clamping pressure being monitored through axial displacement. Such a pressure control is not fully automatic since the operator is required to reset the position sensor by hand after the clamping pressure is adjusted in dependence on the workpiece. Consequently, the actions of the operator introduce a significant safety risk.

A further drawback of conventional chuck drive systems is their inability to differentiate between the prevalent pressures in the pressure chambers. In case a desired clamping pressure is effected in one of the pressure chambers while a residual pressure is still present in the other pressure chamber, only the difference in the two pressures is applied as a force to the piston rod, which means that only this resulting force is crucial for the force applied upon the piston rod. A residual pressure in the pressure chamber may be caused e.g. by a mechanical defect of the check valve which seals this pressure chamber and then fails to open. Conventional pressure monitoring systems are, however, unable to distinguish as to whether the desired clamping pressure is effected only in one pressure chamber or whether a residual pressure is still present in the other pressure chamber. Theoretically, a situation may be encountered in which the residual pressure reaches the desired clamping pressure so that the force applied to the chuck is effectively zero. Conventional pressure monitoring systems cannot recognize this extremely precarious operating state of the chuck cylinder but would simply indicate that the desired clamping pressure is applied. This is one of the reasons why such chuck cylinders have not yet been commercially implemented.

Also, since in conventional pressure monitoring systems only one position sensor is provided for both pressure chambers, this sensor will, of course, not recognize which of the pressure chambers experiences a build up of pressure and in which direction the piston rod will travel as a result. For the control of the machine tool, it is, however, important to receive confirmation that the piston rod travels in the desired direction and to know whether the piston rod applies a pull or a push force for actuating, e.g. a chuck.

In order to minimize energy losses during operation, German publication no. DE-OS 24 19 808 proposes to purge the oil from the gap seals in the headstock with compressed air. This requires however an additional energy source as well as separate valves, and separate annular grooves must be formed within the headstock. The air-oil mist which is created when the gap seal is purged, may in fact be impossible to control, since labyrinth seals as commonly used in these headstocks are ineffective when stationary.

European Pat. No. 0 220 124 B1 also describes a proposal to purge compressed oil from the gap seals by incorporating between the headstock (headstock frame) and the revolving part (spindle body) of the chuck cylinder a transmission block which is pressed against the chuck cylinder in axial direction only when hydraulic fluid is being introduced into one of the two pressure chambers. After the pressure chamber is filled, the transmission block is returned to its initial position by springs. The incorporation of the transmission block significantly complicates the hydraulic system which already is substantial as a result of the monitoring system. Moreover, the overall structural dimensions are increased and are hardly practicable to meet demanded space limitations. In addition, it would be difficult to determine the magnitude of the required contact force for the transmission block. While an excessive force results in an inadmissible metallic contact between the transmission block and the wall surface of the chuck cylinder, a force that is too small leads to excessive energy losses during transmission of pressure. In this way, the functionality of the system can become uncontrollable.

SUMMARY OF THE INVENTION

It is an object of the present invention to provide an improved chuck drive system obviating the afore-stated drawbacks.

In particular, it is an object of the present invention to provide an improved chuck drive system which allows a safe and automatic monitoring of the clamping pressure and operates reliably when the pressure chambers of the rotating cylinder chuck are hermetically sealed off by check valves while safely allowing a shutdown of the hydraulic fluid supply during the operating phase.

These objects and others which will become apparent hereinafter are attained in accordance with the present invention by assigning separate pressure sensors to the pressure chambers to effect a separate and independent pressure measurement by outputting pressure-proportional electric signals and by generating an analog differential pressure signal on the basis of the pressure measurements in the two pressure chambers.

As a result of the present invention, an extremely safe operation is ensured even when the pressure chambers are closed off and the hydraulic fluid supply has been cut. A continuous automatic pressure monitoring system is effected without necessitating any manual intervention to determine the differential pressure which is solely responsible for the actual clamping force. The pressure monitoring system according to the present invention also enables a recognition of the differential pressure signal as controlled variable from the output signals of both pressure chambers as to its sign so that determination as to whether a pull force or push force is applied to the piston rod is possible. Consequently, a stable, reliable, automatic and actual in-process measurement is effected e.g. during machining of a workpiece.

According to another feature of the present invention, the pressure monitoring system further includes a transmitter secured in the piston rod for rotation therewith and receiving the electrical output signals from the pressure sensors, and a stationary receiver secured in the stationary block adjacent the transmitter for receiving information from the transmitter through wireless signal transmission.

As the pressure sensors can be built of small dimensions, the chuck cylinder exhibits a substantially smaller size compared to conventional designs, and a great flexibility is attainable as the pressure sensors can be incorporated at any location. Preferably, the pressure sensors are positioned near the headstock-proximal end of the piston rod and connected via the pressure fluid passageways through the pressure rod with the pressure chambers. As a result of their disposition, the electrical wiring connections between the sensors and the transmitter that is suitably situated on the same end of the piston rod and rotates together with the sensors, are particularly short.

According to another feature of the present invention, the analog differential pressure signal is suitably formed in the rotating transmitter so that only one electric signal is sent from the transmitter to the receiver and thus only one channel is required. The operational safety is fully maintained during shutdown of the supply of pressure fluid so that the headstock can now operate basically without loss at any rotational speed and at any pressure, thereby eliminating previously existing use limitations of conventional chuck drive systems.

According to another feature of the present invention, residual pressure fluid, in particular residual compressed oil remaining inside the contactless sealing gaps of the headstock, is safely drained by forming the outer surface area of the piston rod in the respective sealing gap areas with helical microgrooves by which residual oil is withdrawn from the sealing gaps in a manner resembling a visco-hydraulic pump. Suitably, the withdrawn residual oil is used for lubrication of rolling-contact bearings by which the piston rod is rotatably supported in the headstock.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
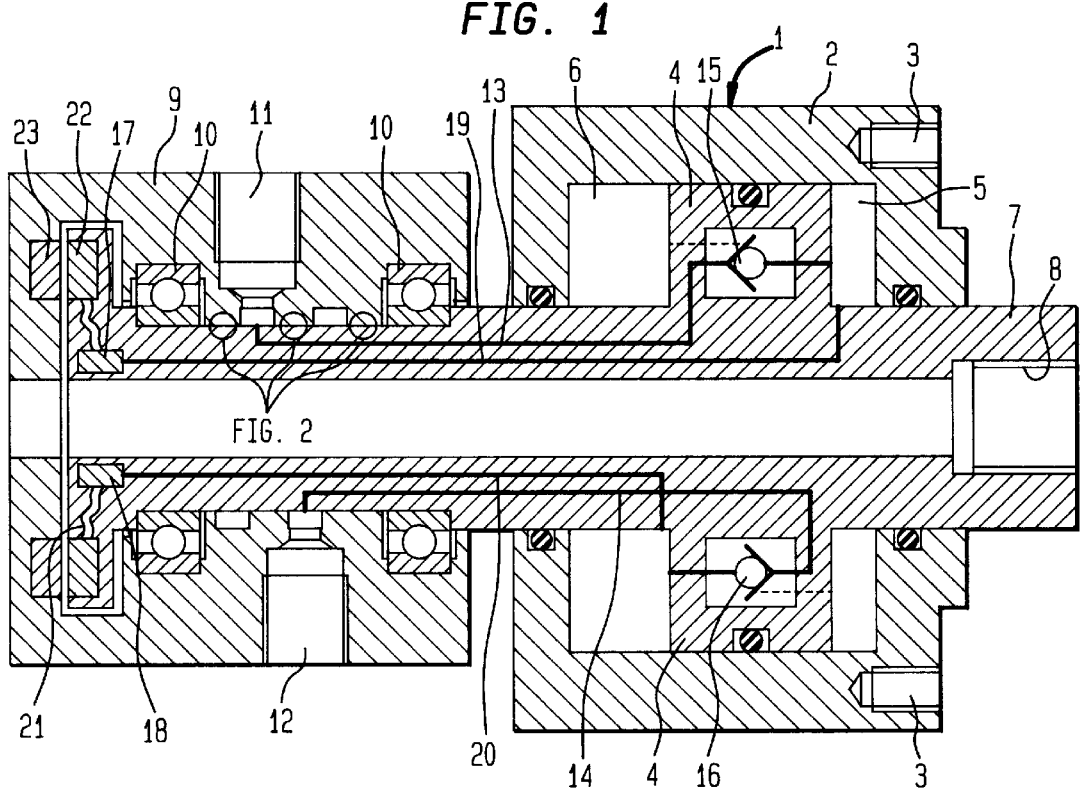
FIG. 1 is a longitudinal section of one embodiment of a chuck drive system according to the present invention.

Throughout all the Figures, the same or corresponding elements are always indicated by the same reference numerals.

Turning now to the drawing, and in particular to FIG. 1, there is shown a longitudinal section of one embodiment of a chuck drive system according to the present invention, including a rotating chuck cylinder, generally designated by reference numeral 1 and having a cylinder body 2 which can be fixedly attached via threaded bores 3 to a rotating spindle of a machine, e.g. a work spindle of a machine tool. Received in the cylinder body 2 is a chuck piston 4 which subdivides the chuck cylinder 1 in two pressure chambers 5, 6. The piston 4 is formed with a piston rod 7 which has one axial end exhibiting a female thread 8 for attachment of e.g. a pull rod of a power clamping device on the other end of the work spindle. As the pull rod, work spindle and power clamping device do not form part of the invention, illustration thereof is omitted from the drawings for sake of simplicity.

With its other end, the piston rod 7 is rotatably supported in a stationary frame or headstock 9 by two rolling-contact bearings 10. The headstock 9 is formed with inlet ports 11, 12 for supply of pressure fluid. Persons skilled in the art will understand that the inlet ports 11, 12 are part of a hydraulic unit with incorporated control valves. However, this hydraulic unit is of generally known design and does not form part of the present invention so that illustration thereof is omitted from the drawings.

The inlet ports 11, 12 are connected to the pressure chambers 5, 6 via passageways 13, 14 which extend through the piston rod 7. Disposed in the chuck piston 4 in the path of the passageways 13, 14 are check valves 15, 16 which are respectively assigned to the two pressure chambers 5, 6. The check valves 15, 16 ensure that after the desired clamping pressure is applied to one of the pressure chambers 5, 6 through introduction of a pressure fluid, preferably compressed oil, the clamping pressure is maintained in this pressure chamber even when the supply of pressure fluid is cut during the operation.

In order to provide a safe operation and to continuously monitor the fluid pressure inside the pressure chambers 5, 6, separate pressure sensors 17, 18, are respectively assigned to the pressure chambers 5, 6. These pressure sensors 17, 18 are of small dimensions and exhibit an inlet port for pressure fluid and an electrical signal output, to thereby enable a measurement of the pressure in the pressure chambers 5, 6 separately and independently from each other, and to output an electrical pressure-proportional signal commensurate with the measurement of the pressure.

For direct and continuous monitoring of the pressure, the pressure sensors 17, 18 can, in principle, be positioned at any location inside the pressure chambers 5 and 6. Preferred however is a disposition in which the pressure sensors 17, 18 are incorporated in the piston rod 7 at the section thereof that is supported in the headstock 9, i.e. in proximity to the headstock-near end of the piston rod 7. Although this disposition of the pressure sensors 17, 18 requires two slightly longer fluid passageways 19, 20 to the pressure chambers 5, 6 within the piston rod 7, the electrical wiring 21 between the pressure sensors 17, 18 and a rotating transmitter 22 which is also embedded in the headstock-proximal end of the piston rod 7 can then be kept short. Positioned adjacent to the transmitter 22 in opposite disposition is a receiver 23 which is placed within the stationary headstock 9.

Each pressure sensor 17, 18 supplies a voltage signal which is proportional to the pressure inside the corresponding pressure chamber 5, 6 and which is transmitted wirelessly by the transmitter 22 to the receiver 23. The voltage signals from the two pressure sensors 17, 18 are processed to supply an analog differential pressure signal. This operation is preferably already carried out in the rotating transmitter 22 so that only one signal needs to be transmitted from the transmitter 22 to the receiver 23, allowing single-channel operation. For controlling the machine tool, the receiver 23 can now simply supply the differential pressure signal commensurate to the solely pertinent pressure differential of the pressures in the pressure chambers 5, 6 since the effective force on the piston rod 7 is caused solely by this differential pressure. The determination of the pressure differential may also be distinguished with respect to the sign, i.e. determination is possible as to whether the piston rod 7 executes a pull force or a push force.

Figure 3:
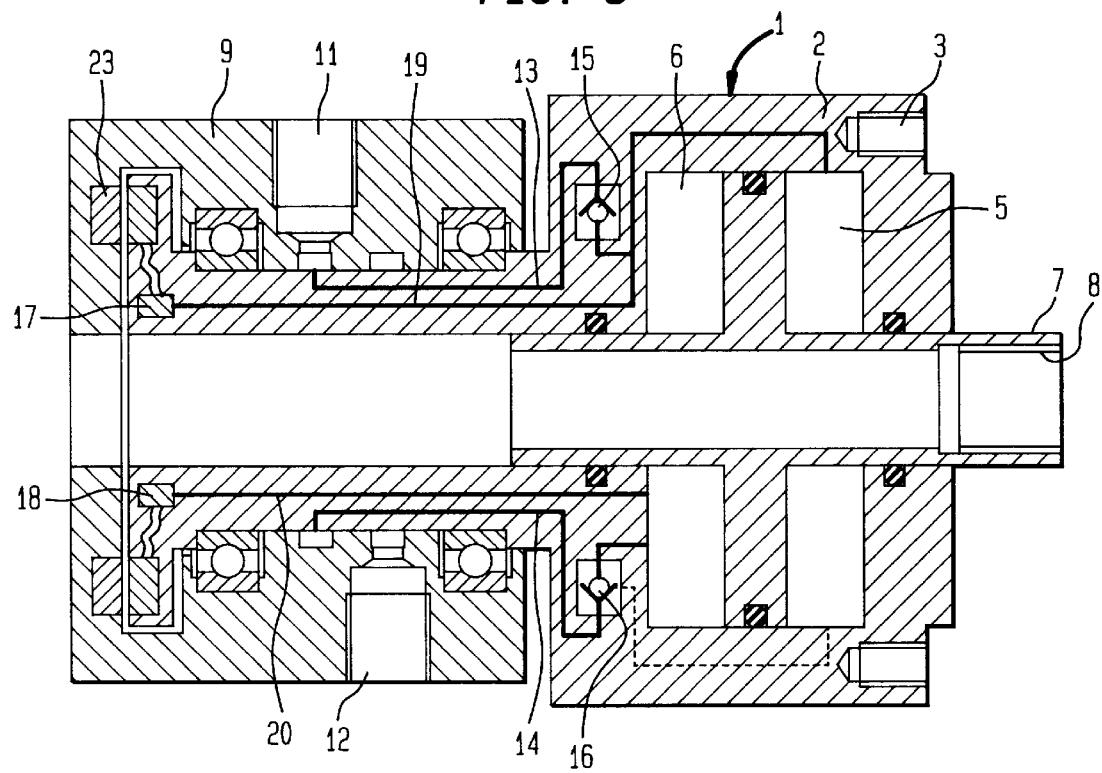
FIG. 3 is a longitudinal section of another embodiment of a chuck drive system according to the present invention.

Persons skilled in the art will understand that it is certainly within the scope of the invention to house the pressure sensors 17, 18 and the transmitter 22 within the cylinder body 2, while the receiver 23 is situated in the headstock 9 in opposition to the transmitter 22 as shown e.g. in FIG. 3.

Figure 2:
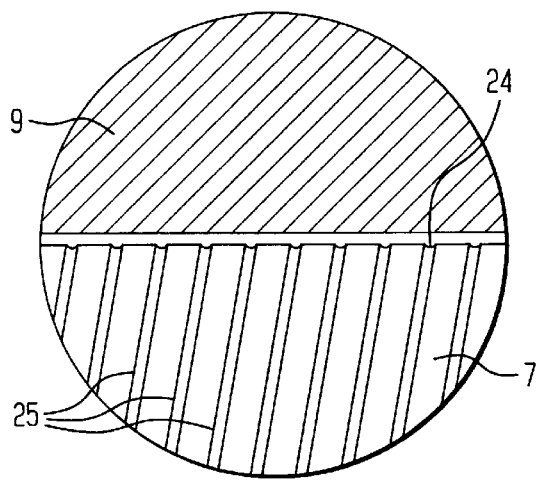
FIG. 2 is a partially sectional illustration, on an enlarged scale, through a light gap zone between the piston and the headstock.

After generation of the required clamping pressure and providing the necessary clamping force on the power clamping device, e.g. a chuck, the supply of pressure fluid can now be safely cut while fully ensuring the operational safety so that the losses which restrict the useful operating range of the headstock can be eliminated. This requires however that residual pressure fluid, particularly the residual compressed oil, is purged from the axial sealing gap 24 by which the pressure fluid supply is sealed between the outer surface area of the piston rod 7 and the headstock 9. As shown in FIG. 2, this is accomplished in a simple and effective manner by forming the outer surface area of the piston rod 7 with helical microgrooves 25 which can easily be incorporated during surface finishing process of the piston rod 7 through precision turning. In relation to the vertical extension of the axial sealing gap 24 the microgrooves 25 exhibit a relevant depth and act in conjunction with the rather slight vertical extension of the sealing gap 24 and the viscosity of the compressed oil in form of a visco-hydraulic pump which expels the residual compressed oil from the sealing gaps 24.

Preferably, the sealing gap 24 and the microgrooves 25 on the outer surface area of the piston rod 7 are located in an area between the two rolling-contact bearings 10. The residual compressed oil can thereby be transported into one or the other of the two rolling-contact bearings 10, depending on the direction of rotation, for effecting a lubrication. The rolling-contact bearing mechanism is thus no longer subjected to forces caused by the transmission of pressure fluid.

While the invention has been illustrated and described as embodied in a chuck drive system, especially for a rotating clamping device of a machine tool, it is not intended to be limited to the details shown since various modifications and structural changes may be made without departing in any way from the spirit of the present invention.

What is claimed as new and desired to be protected by letters patent is set forth in the appended claims:

1. A chuck drive system, especially for a rotating clamping device of a machine tool, comprising:

a rotating chuck cylinder;

a stationary frame positioned adjacent the chuck cylinder;

a piston subdividing the cylinder into two pressure chambers and slidable in response to a fluid pressure in the pressure chambers;

fluid passageway means including passageways for supply of fluid under pressure to the pressure chambers;

valve means positioned in the passageways for maintaining the fluid pressure in the pressure chambers; and a pressure monitoring unit for checking the fluid pressure difference in the pressure chambers, said pressure monitoring unit including two pressure sensors, one pressure sensor being operatively connected to one of the pressure chambers and the other pressure sensor being operatively connected to the other one of the pressure chambers, for determining the fluid pressure in each of the pressure chambers separately and independently from one another, said pressure sensors forming electrical output signals commensurate with the fluid pressure in the pressure chambers, said pressure monitoring unit having means for deriving from the output signals an analog differential pressure signal to determine an actuation force applied upon the piston and to maintain said actuation force on the piston constant, thereby allowing safe operation of the chuck drive system when the supply of fluid under pressure is cut.

2. The chuck drive system defined in claim 1 wherein the pressure monitoring unit includes a transmitter secured in the piston rod for rotation therewith and receiving the electrical output signals from the pressure sensors, and a stationary receiver secured in the stationary frame and receiving information from the transmitter through wireless signal transmission.

3. The chuck drive system defined in claim 2 wherein the information formed by the transmitter is the analog differential pressure signal for transmission to the receiver.

4. The chuck drive system defined in claim 1 wherein the pressure sensors are secured in the piston rod.

5. The chuck drive system defined in claim 2 wherein the pressure sensors are secured in the piston rod in a section thereof supported by the stationary frame and the transmitter is disposed adjacent thereto at the one end of the piston rod, with the receiver being positioned in the stationary frame in opposition to the transmitter.

6. The chuck drive system defined in claim 2 wherein the chuck cylinder includes a cylinder body, with the pressure sensors being disposed in the cylinder body of the chuck cylinder.

7. The chuck drive system defined in claim 1 wherein the piston rod has an outer surface area and the stationary frame exhibits an inner surface area, with a sealing gap being formed between the outer surface area of the piston rod and the inner surface area of the stationary frame, said outer surface area of the piston rod exhibiting a section formed with helical microgrooves adjacent the sealing gap for draining residual pressure fluid from the sealing gap.

8. The chuck drive system defined in claim 7, and further comprising two rolling-contact bearings for rotatably supporting the piston rod in the stationary frame, with the sealing gap and the section of the microgrooves being positioned in an area between the rolling-contact bearings.

9. The chuck drive system defined in claim 1 wherein the piston is formed with a piston rod having one end rotatably supported in the stationary frame.

10. The chuck drive system defined in claim 9 wherein the passageways extend through the piston rod.

* * * * *